US00RE42317E

(19) United States
(12) Reissued Patent
Al-Dhahir et al.

(10) Patent Number: US RE42,317 E
(45) Date of Reissued Patent: May 3, 2011

(54) METHOD AND APPARATUS FOR FILTERING DIGITAL TELEVISION SIGNALS

(75) Inventors: Naofal Mohammed Wassel Al-Dhahir, Plano, TX (US); John Erik Hersey, Ballston Lake, NY (US); Nick Andrew Van Stralen, Bloomfield, NY (US); Richard Louis Frey, Delanson, NY (US); Mark Lewis Grabb, Burnt Hills, NY (US)

(73) Assignee: General Electric Compay, Schenectady, NY (US)

(21) Appl. No.: 11/709,931

(22) Filed: Feb. 22, 2007

Related U.S. Patent Documents

Reissue of:

(64) Patent No.: 6,122,015
Issued: Sep. 19, 2000
Appl. No.: 09/206,409
Filed: Dec. 7, 1998

U.S. Applications:

(63) Continuation of application No. 10/728,934, filed on Dec. 5, 2003, now abandoned, which is a continuation of application No. 10/247,455, filed on Sep. 19, 2002, now abandoned.

(51) Int. Cl.
*H04N 5/213* (2006.01)

(52) U.S. Cl. ..... 348/614; 348/607; 348/608; 348/914

(58) Field of Classification Search ..... 348/607, 348/608, 611–614, 624, 914, 460, 461, 466, 348/467; 375/343, 340, 261, 347, 232, 233, 375/229; 333/18, 28 R; 708/300, 322, 323; *H04N 5/21, 5/213*

See application file for complete search history.

(56) References Cited

U.S. PATENT DOCUMENTS 5,119,196 A * 6/1992 Ayanoglu et al. ..... 348/614
5,479,446 A * 12/1995 Mourot ..... 375/243
5,533,067 A * 7/1996 Jamal et al. ..... 375/341
5,537,438 A * 7/1996 Mourot et al. ..... 375/231
5,559,723 A * 9/1996 Mourot et al. ..... 375/229
5,610,661 A * 3/1997 Bhatt ..... 348/446
5,946,351 A * 8/1999 Ariyavisitakul et al. ..... 375/233
6,211,926 B1 * 4/2001 Won ..... 348/734
6,281,935 B1 * 8/2001 Twitchell et al. ..... 348/470
6,304,299 B1 * 10/2001 Frey et al. ..... 348/614
6,498,627 B1 * 12/2002 Hershey et al. ..... 348/725

FOREIGN PATENT DOCUMENTS

EP 800285 * 10/1997
GB 2287620 * 9/1995

OTHER PUBLICATIONS

"HDTV Research in Japan," IEEE Micro, Oct. 1993, pp. 49–53.*

(Continued)

*Primary Examiner*—Sherrie Hsia

(57) ABSTRACT

A system for filtering digital television signals is provided. The system comprises a generator for providing a first data sequence to a private data packetizer, and a transmitter for transmitting the packetized first data sequence in a data channel of a digital television signal. The system further includes a receiver for receiving the digital television signal and recovering the first data sequence. The receiver includes a channel estimator for providing an estimate of channel characteristics, such as estimated channel impulse estimate and estimated noise variance. The receiver further includes an adaptive equalizer filter having an input for receiving the digital television signal and an input for receiving adaptive filter coefficients. The receiver further includes a coefficient processor for calculating adaptive filter coefficients based on the channel estimate, and providing the adaptive filter coefficients to the adaptive equalizer filter. The digital television signal is thus filtered to remove undesired channel effects.

66 Claims, 7 Drawing Sheets

OTHER PUBLICATIONS

"Design and Selection of a Ghost Cancelling Reference Signal for Television Systems in North America," Proceedings of Canadian Conference on Electrical and Computer Engineering, Vancouver, BC, Canada, Sep. 14–17, 1993, pp. 660–663.*

"Training Signal and Receiver Design for Multi–Path Channel Characterization for TV Broadcasting," D.–D Wang, T. –H.S. Chao, BR Saltzberg, IEEE Transactions on Consumer Electronics, vol. 36, No. 4, Nov. 1990, pp. 794–806.*

"Fast Computation of Channel–Estimate Based Equalizers in Packet Data Transmission," N. Al–Dhahir, J. Cioffi, IEEE Transactions on Signal Processing, vol. 43, No. 11, Nov. 1995, pp. 2462–2473.*

ATSC Digital Television Standard, "Annex D" Sction 4.1, pp. 46–48, Sep. 16, 1995.

* cited by examiner

METHOD AND APPARATUS FOR FILTERING DIGITAL TELEVISION SIGNALS

Matter enclosed in heavy brackets [ ] appears in the original patent but forms no part of this reissue specification; matter printed in italics indicates the additions made by reissue.

*This is a continuation of application Ser. No. 10/728,934 filed Dec. 5, 2003, abandoned, which is a continuation of application Ser. No. 10/247,455 filed Sep. 19, 2002, abandoned, which is a reissue of application Ser. No. 09/206,409, filed Dec. 7, 1998, Pat. No. 6,122,015.*

BACKGROUND OF THE INVENTION

This invention relates in digital television and, more particularly, to methods and apparatus for filtering digital television signals to remove multipath and other undesirable effects upon a digital television signal as the signal propagates through a channel.

Digital television is an emerging technology that is the subject of much research both in the United States and Japan. Because of the potential advantages of digital television and the many technical problems associated therewith, research into improved systems and methods for transmitting and receiving digital television signals is increasing.

One of the most important prevalent problems associated with digital television signals is the problem of multipath effects. The term multipath, as used herein, refers to the propagation of electromagnetic waves along various paths from the digital television transmitter to the digital television receiver. Multipath effects may arise from fixed structures, such as building walls, acting as reflectors in the transmission channel. Moving objects, such as airplanes, may also cause a multipath condition. Even microreflections in cabling can cause multipath conditions. These structures can cause transmission of the television signal to occur along more than one path from the transmitter to the receiver. As a result, the same signal may be received more than once, and at different times by a single, or multiple, receivers. The result of multipath effects in analog television is to create "ghosts" in the displayed television image. In digital television, the effects of multipath can include moderate to severe degradation in the displayed TV picture and sound.

Various methods and systems have been designed to address the problem of multipath. See, for example, P. T. Marhiopoulos and M. Sablatash, "Design of a Ghost Canceling Reference Signal for Television Systems in North America," Proceedings of Canadian Conference on Electrical and Computer Engineering, Vancouver, BC, Canada, Sep. 14–17, 1993, pp. 660–663.

The statistics of multipath ghosts have been studied and compiled by, among others, the BTA (Japan's Broadcasting Technology Association). The BTA, and other concerns, designed a "ghost canceling reference" (GCR) transmitted signal to mitigate these multipath effects. The BTA GCR was found to be less than satisfactory in some cases. While homes with outdoor antennas displayed non-varying (stationary) ghosting conditions which could be largely corrected, those homes with indoor antennas experienced changing (dynamic) ghosts. These ghosting conditions were more prevalent where people were moving about the room or other moving objects were in the signal path. The BTA ghost canceller generally was not able to adequately compensate for these conditions. Therefore, a need remains for a system and method for filtering out, or removing, multipath components from digital television signals, and especially for systems and methods for filtering multipath components from a digital television signal when the multipath component arises from moving objects and dynamic conditions in a transmission channel.

BRIEF SUMMARY OF THE INVENTION

In an exemplary embodiment of the invention a system for filtering digital television signals comprises a generator for providing a first data sequence to a private data packetizer, and a transmitter for transmitting the packetized first data sequence in a data channel of a digital television signal. The system further includes a receiver for receiving the digital television signal and recovering the first data sequence. The receiver includes a channel estimator for providing an estimate of channel characteristics such as estimated channel impulse response and estimated noise variance. The receiver further includes an adaptive equalizer filter having an input for receiving the digital television signal and an input for receiving adaptive filter coefficients. The receiver further includes a coefficient processor for calculating adaptive filter coefficients and providing the adaptive filter coefficients to the adaptive equalizer filter. The equalizer filter is in communication with the output of the comparing circuit such that filter coefficients of the adaptive filter are adjusted according to the estimate of the impulse response of the data channel. In one embodiment of the present invention, the television transmission is coded according to a Motion Picture Experts Group (MPEG-2) standard.

A method of filtering a digital television transmission comprises the steps of generating a first data sequence at a transmitter and periodically inserting the first data sequence into a digital television bit stream to be transmitted. The method further comprises the steps of transmitting the digital television bit stream through a channel to a receiver, receiving the digital television bit stream and extracting the first data sequence from the digital television bit stream. The extracted first data sequence includes channel induced noise. The method further includes the steps of comparing the extracted first data sequence, including channel induced noise, to a second data sequence. The second data sequence is locally generated, that is, the second data sequence is generated at the receiver and does not include channel induced noise. However, in one embodiment of the present invention the second data sequence contains the same data as the first data sequence. The method further includes a step of provide a channel estimate based on the comparison step. The method further includes the steps of applying the received television bit stream to an adaptive filter and adaptively adjusting filter coefficients of the adaptive filter according to the channel estimate such that undesirable channel effects, such as noise, upon said received television bit stream are filtered from said received television bit stream.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Transmitter

Figure 1:
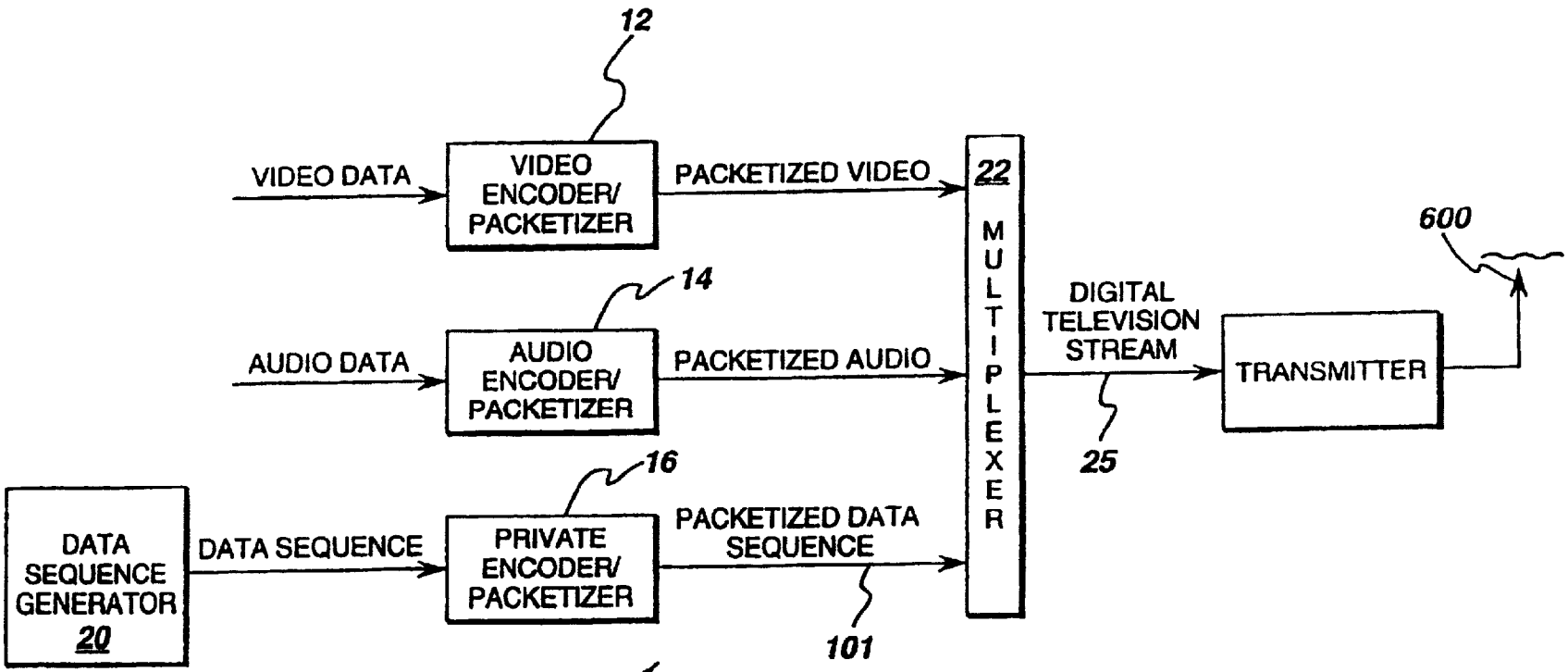
FIG. 1 is a block diagram of a digital television transmitter according to an embodiment of the present invention.

FIG. 1 is a block diagram of one embodiment of a digital television transmitter 10 adapted according to the present invention. Digital television transmitter 10 includes circuitry typically used and generally known in the art of digital television to packetize and encode audio and video signals for transmission to a digital television receiver. Typical circuits include video encoder/packetizer 12, audio encoder/packetizer 14 and private data encoder/packetizer 16. Private data encoder/packetizer 16 is used to encode and packetize what is known in the art as a private data stream. Typical uses for a private data stream include carrying parity bits for other data packets, allowing for increased error detection and correction. The private data stream may also be used to carry measured distortion. Measured distortion is distortion purposely introduced as part of a pay for quality service.

The present invention relies upon use of the private data stream of a packetized digital television signal. According to the present invention, transmitter 10 includes a data sequence generator 20. Data sequence generator 20 generates a predetermined sequence of digital bits. Any sequence of bits can be selected for generation by first data sequence generator 20. The particular sequence selected is not important as long as the sequence is a known and repeatable bit pattern suitable for packetization. The data sequence from first data sequence generator 20 is provided to private encoder/packetizer 16 where it is encoded and packetized in the same manner as other private data such as parity bits.

The packetized data sequence is then combined by multiplexer 22 with packetized audio and video signals in accordance with a digital formatting standard to provide digital television stream 25. In one embodiment of the present invention the MPEG-2 (Motion Picture Expert Group) coding standard is employed. In alternative embodiments of the present invention the digital television signal is coded generally in accordance with the ATSC (Advanced Television Standards Committee) standard. The ATSC standard, which includes the MPEG format, allows each 19.3 Mbps of information to be time divided into video, audio, and private data channels. The information is transmitted in packets of 188 bytes, and each packet begins with a packet identifier (indicating which data stream it belongs to, for example, voice stream number three or video stream number one, etc.). Accordingly the packet containing the data sequence generated by first data sequence generator 20 is identified as belonging to a "private" data stream. Digital television stream 25 is transmitted, or broadcast, as a digital television signal through channel 600 to a digital television receiver. It will be recognized by those skilled in the art that the invention is not limited to MPEG signal formats. In fact, the invention could be utilized with any digital television signal carrying information in packets.

Receiver

Figure 1A:
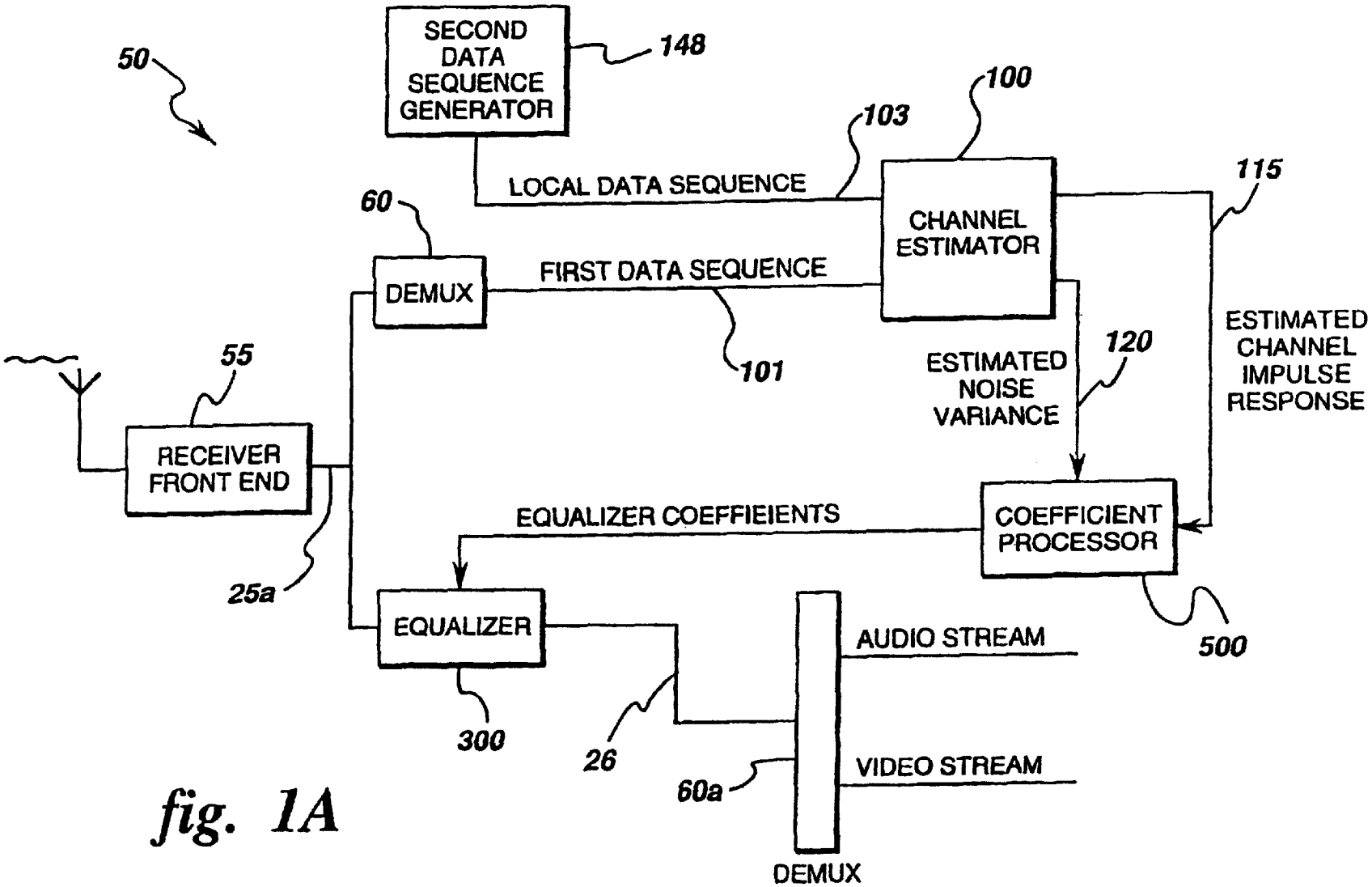
FIG. 1A is a block diagram of a digital television receiver including a filter according to the present invention.

FIG. 1A is a block diagram of a digital television receiver 50 adapted according to the present invention. A television receiver designed without knowledge of the novel use of the private data channel would simply discard data sequence information. Television receivers designed in accordance with the present invention, effectively utilize the data sequence information as described below to improve the quality of the received signal.

The digital television signal, including the packetized video, audio and private data sequences, is received and preprocessed by receiver front end 55 to demodulate the signal and to recover digital television stream 25. Recovered digital television stream 25a is essentially the same signal as digital television stream 25, but may have been degraded, corrupted, or otherwise affected by particular propagation characteristics of channel 600.

Private data stream 101 is recovered from digital television stream 25a by demultiplexer 60. As previously described herein, the information on the private data stream comprises a known data sequence. The received known data sequence is indicated in FIG. 1A as first data sequence 101. First data sequence 101 is provided to channel estimator 100. Also provided to channel estimator 100 is local data sequence 103. Local data sequence 103 is the same data sequence as first data sequence 101, except local data sequence 103 has not been affected by the characteristics of channel 600. Channel estimator 100 estimates the propagation characteristics of channel 600 by comparing local data sequence 103 to first data sequence 101. In other words, channel estimator 100 provides a channel estimate based on comparison of data sequence 102 and 103. In one embodiment of the present invention, the channel estimate comprises estimated channel impulse response signal 115 and estimated noise variance signal 120. Estimated channel impulse response signal 115 and estimated noise variance signal 120 are provided to coefficient processor 500.

Coefficient processor 500 determines filter coefficients, which, when applied to equalizer 300, causes equalizer 300 to undo the effects of channel 600 on recovered digital television stream 25a. Thus, multipath components and other distortions in the signal are filtered from the digital television signal. The filtered audio and video streams may then be recovered from the digital television signal and processed in accordance with methods and apparatus known in the art.

According to one embodiment of the present invention (not shown), a Least Mean Squares (LMS) algorithm is employed to obtain filter coefficients to be applied to equalizer 300. However, this technique has a drawback in that the convergence time of the least mean square (LMS) algorithm is inversely proportional to the smallest eigenvalue of the autocorrelation matrix of the received sequence (input to equalizer). On channels with severe multipath and in-band nulls, this smallest eigenvalue becomes very close to zero which could slow down the LMS equalizer convergence.

An embodiment of the invention that avoids this autocorrelation matrix problem is illustrated in FIG. 1A. The embodiment of FIG. 1A includes a channel estimator 100. Channel estimator 100 obtains a channel estimate and provides the channel estimate to coefficient processor 500. Coefficient processor 500 then uses the channel estimate to compute equalizer coefficients to be applied to the taps of adaptive equalizer 300. The term channel estimate, as used herein means the channel characteristics as represented by the impulse response signal 115 and estimated noise variance signal 120. Channel impulse response signal 115 is estimated based on comparison of data sequence 101 (embedded in each transmitted block of the digital television bit stream 25), and locally generated data sequence 103. The channel estimate is then used, together with an estimate of the channel signal-to-noise ratio (SNR), i.e., estimated noise variance signal 120, to compute the optimum coefficients of adaptive equalizer 300. Received digital television stream 25a is applied to the input of equalizer filter 300. The response of equalizer 300 to digital television stream 25a, as determined by equalizer coefficients 130 and 140, is such that undesirable channel effects on digital television stream 25a are filtered from digital television stream 25a.

Channel Estimator

Figure 2:
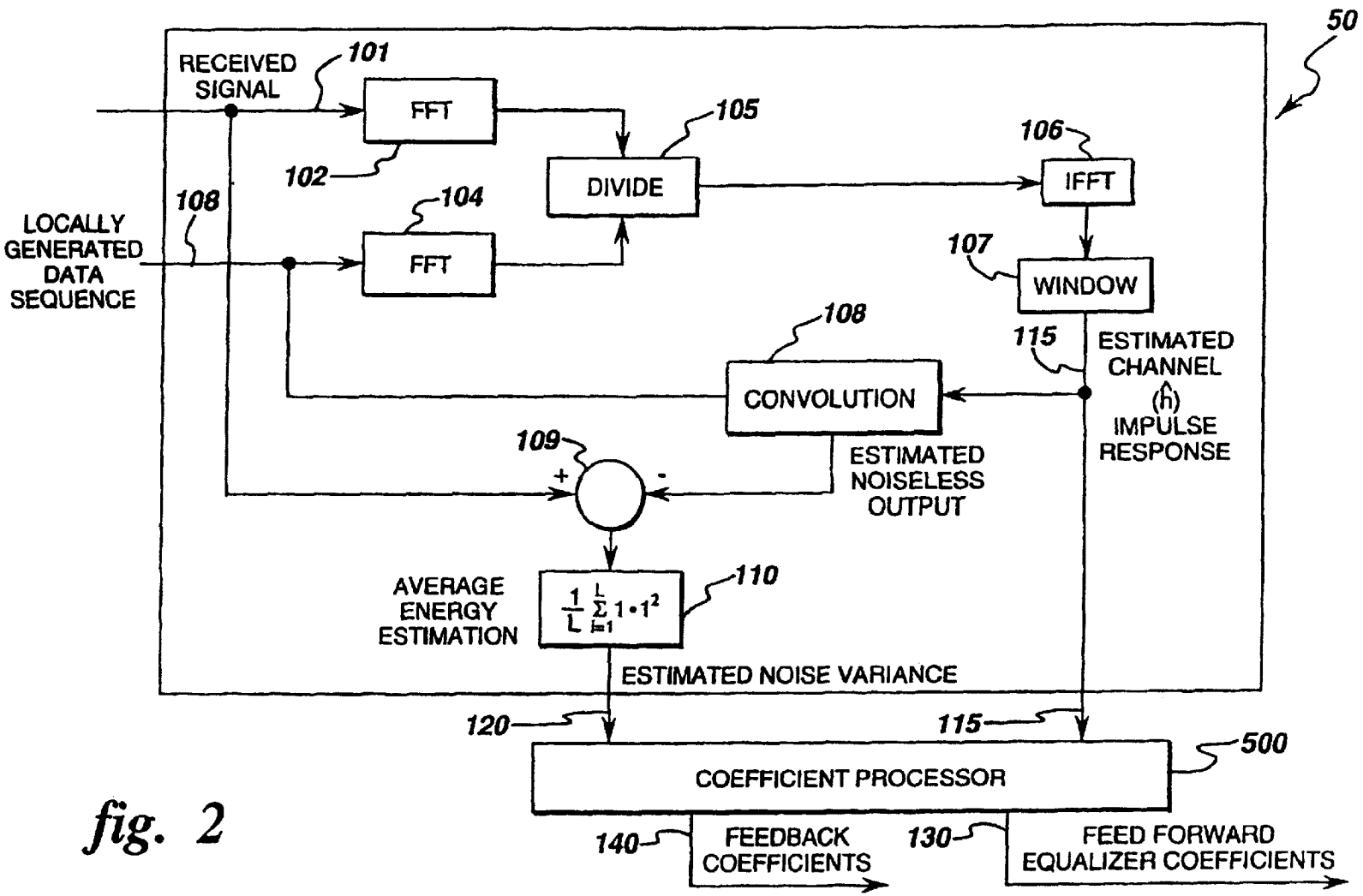
FIG. 2 is a block diagram of an embodiment of a channel estimator according to the invention.

One embodiment of channel estimator 100 is depicted in FIG. 2. As previously described, a known data sequence 101 is transmitted over a channel 600. The received data sequence signal 101 has passed through channel 600 and has likely been corrupted by noise. Data sequence 101 is applied to first Fast Fourier Transformer (FFT) 102 which computes the FFT of noisy and distorted received data sequence signal 101. Locally generated data sequence 103 is generated by second data sequence generator 148 (best ilustrated in FIG. 1A) and applied to second Fast Fourier Transformer 104. Second FFT 104 computes the FFT of second data sequence 103. Divider 105 divides the FFT of the received signal by the FFT of the locally-generated data sequence. The output of divider 105 is an estimate of the channel frequency response.

The channel impulse response signal 115 is computed by Inverse FFT (IFFT) 106 which computes the inverse FFT of the computed channel frequency response output from divider 105. The resulting time-domain response is provided to window circuit 107 to obtain an estimated channel response $\dot{h}=[h_0\ h_1\ \ldots\ h_v]$. The starting location and width of window 107 is determined by requiring that the windowed impulse response contains most of the energy (e.g., 99% or higher) of the un-windowed channel impulse response..

An estimate of the noise variance, and hence the channel signal-to-noise ratio (SNR) is determined by computing the average energy of the channel estimation error sequence. The channel estimation error sequence is equal to the difference output of subtractor 109. Subtractor 109 computes the difference between the actual received sequence and the estimated received sequence (formed by convolving in convolution function 108 the locally-generated training signal on channel 103 with the estimated windowed channel impulse response from the window function 107) and the received signal on channel 101. The average energy estimation is then computed by function 110 as $$\frac{1}{L}\sum_{i=1}^{L}|\bullet|^2,$$

where L represents the length of the received sequence, and |●| represents the absolute value of the received sequence function.

Once the channel impulse response and channel SNR estimates are available, they are provided to coefficient processor 500 and used to compute the optimum equalizer coefficients for equalizer 300.

Equalizer

Figure 3:
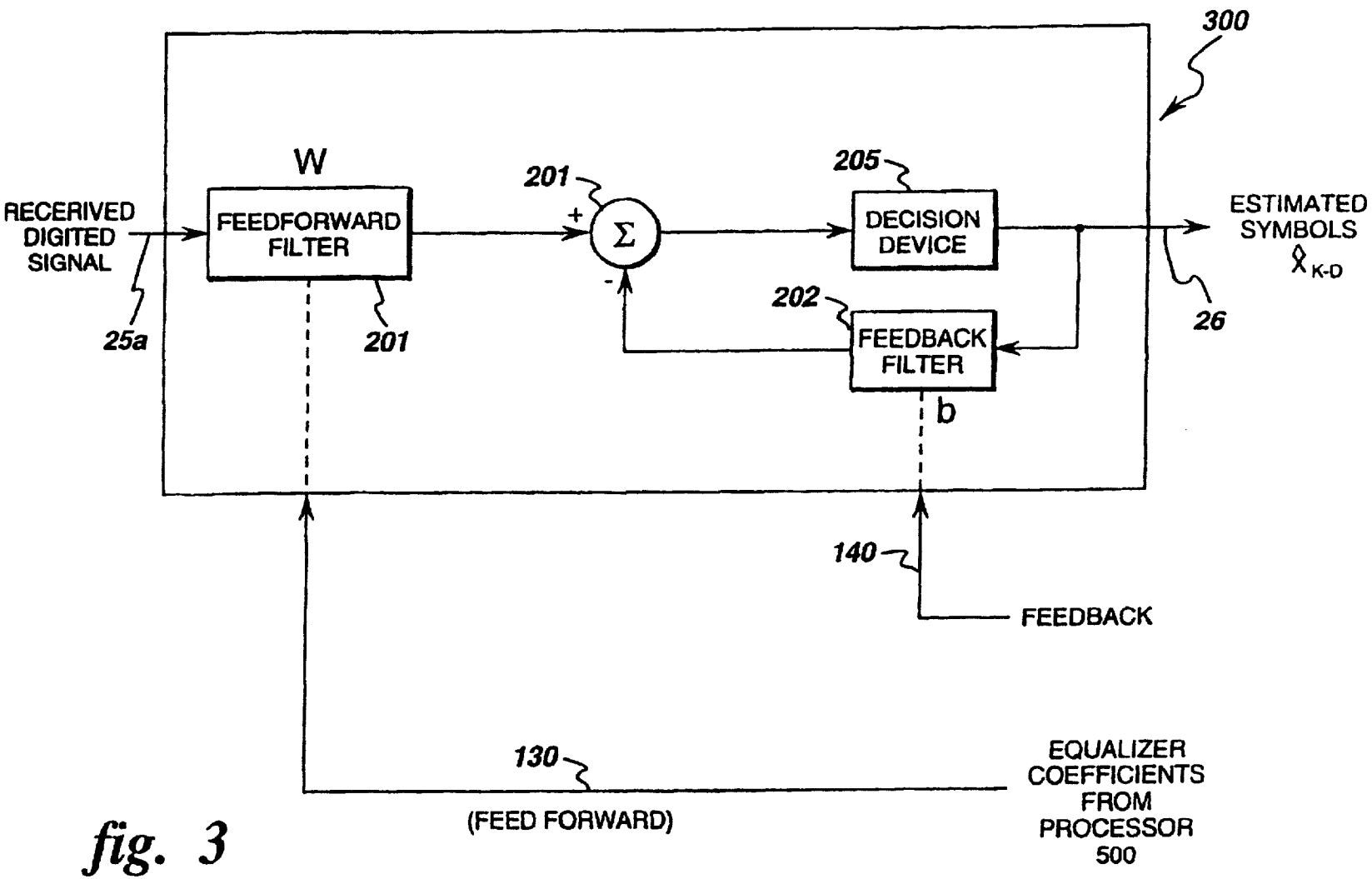
FIG. 3 is a block diagram of one embodiment of an equalizer filter according to the present invention.

The equalizer structure employed in one embodiment of the invention is the minimum mean square error decision-feedback equalizer (MMSE-DFE) shown in FIG. 3. This equalizer structure consists of two finite-impulse-response (FIR) filters 201, and 202. The first FIR filter is a feed forward filter 201 (denoted by w), and the second FIR filter is a feedback filter 202 (denoted by b). FIR filter 201 receives digital television stream 25a at an input and outputs a filtered signal to summer 204. The output of summer 204 is provided to a decision device 205. The output of decision device 205 is estimated symbols denoted $\hat{x}_{k-\Delta}$ This output is also fed back to FIR filter 202, the filtered output of which constitutes the second input to summer 204. It is this output that is subtracted from the output of FIR filter 201. The coefficient settings of the two FIR filters 201 and 202 are optimized to minimize the mean square value (or equivalently average energy) of the error sequence (which is equal to the difference between this input and output of the decision device 205 in FIG. 3). Previously detected-symbols, denoted in FIG. 3 by $\hat{x}_{k-\Delta}$, are fed back and filtered to remove their interfering effect of current and future symbols yet to be detected. The coefficients for both FIR filters 201 and 202 are provided by coefficient processor 500.

Coefficient Processor

In one embodiment of the present invention coefficient processor 500 computes the equalizer coefficients from impulse response signal 115 in a non-iterative (i.e., one shot) computation that has a closed form and is coded on a programmable digital signal processor (DSP) chip. In one embodiment of the present invention, computing the optimum equalizer coefficients from the channel impulse response estimate is accomplished by inverting a correlation matrix whose size is equal to the total (feed forward and feedback) number of equalizer taps according to methods well known to those of ordinary skill in the art of signal processing. Other equalizer computation algorithms suitable for use in conjunction with the present invention are known to those of ordinary skill in the art. In one embodiment of the present invention the equalizer computation algorithm is implemented on a commercially available programmable digital signal processor. In another embodiment of the present invention, the equalizer computations are implemented on an ASIC. As will be readily apparent to those of ordinary skill in the art, other integrated circuits or processor means may be employed to execute algorithms for computing equalizer coefficients.

Figure 4:
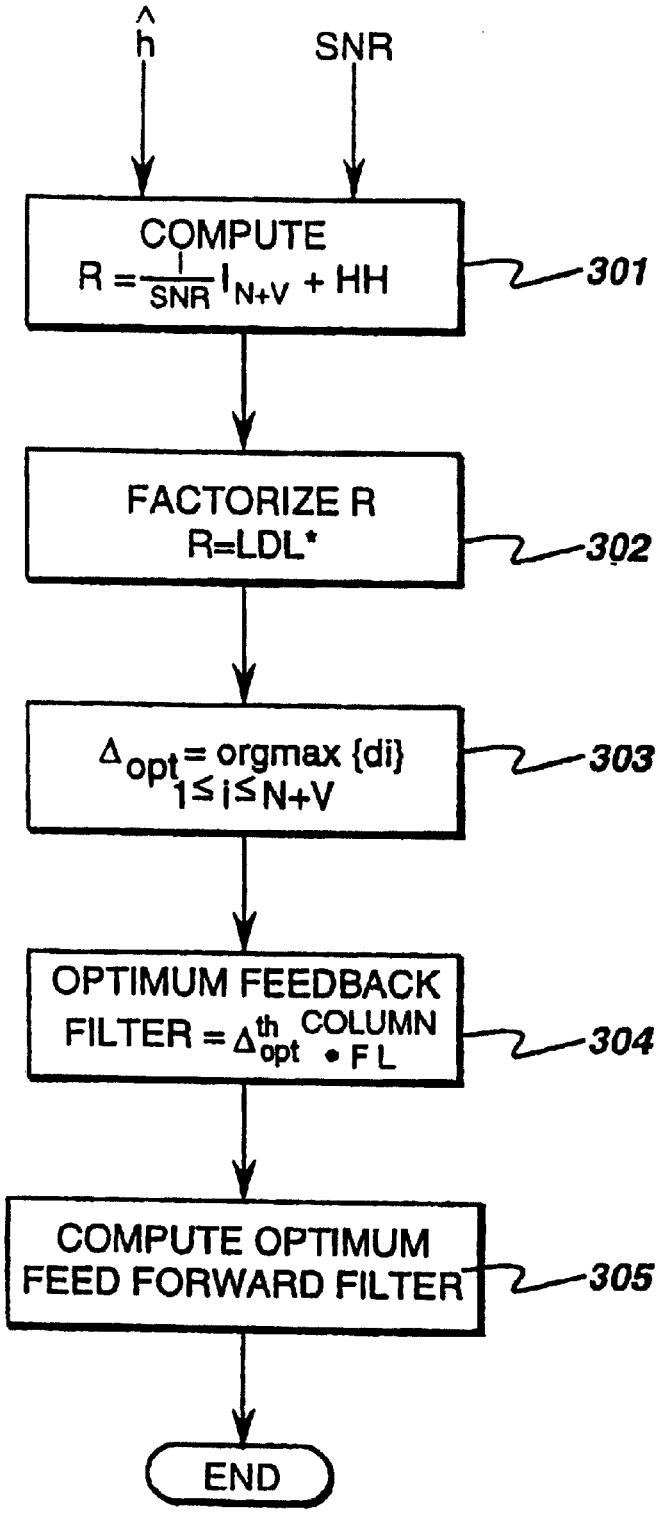
FIG. 4 is a flow diagram of a method for generating equalizer coefficients according to one embodiment of the present invention.

A flow chart of the steps of a method and algorithm of the present invention implemented by coefficient processor 500 to compute the optimum filter coefficients of equalizer 300 is shown in FIG. 4. The estimated channel impulse response and estimated noise variance are used to construct the matrix R in function step 301, where $$R = \frac{1}{SNR}I_{N+v} + H*H.$$

This matrix is then factorized in step 302 into the product of a lower-triangular matrix L, $$L = \begin{bmatrix} 1 & 0 & 0 & 0 \\ x & 1 & 0 & 0 \\ x & x & 1 & 0 \\ x & x & x & 1 \end{bmatrix},$$

a diagonal matrix D, $$D = \begin{bmatrix} d_1 & 0 & 0 & \cdots & 0 \\ 0 & d_2 & 0 & \cdots & 0 \\ 0 & 0 & \ddots & \cdots & 0 \\ \vdots & \vdots & \vdots & \ddots & \vdots \\ 0 & 0 & 0 & \cdots & d_{N+v} \end{bmatrix}, \text{ and}$$

an upper-triangular matrix L*, where * denotes the complex conjugate transpose operation. This factorization is commonly known as a "triangular" or "Cholesky" factorization in matrix theory.

This triangular factorization contains all the information needed to compute the optimum MMSE-DFE filter settings and determine the optimum delay parameter Δ. More specifically, the optimum delay, $\Delta_{opt}$, is equal to the index of the largest diagonal element of matrix D in function block 303. That is, $$\Delta_{opt} = \underset{1 \le i \le N+v}{\arg\max\{d_i\}}.$$

The optimum feedback filter coefficients 140 (designated as Filter) are set to $\Delta_{opt}^{th}$ column of the matrix L in step 304. The optimum feed forward filter coefficients 130 are obtained in step 305 by multiplying the channel matrix H by the $\Delta_{opt}^{th}$ column of the complex conjugate transpose of the $L^{-1}$ matrix and dividing the resulting column vector by the scalar $d_{\Delta_{opt}}$, that is $$H = \begin{bmatrix} h_0 & h_1 & \cdots & h_v & \cdots & \cdots & 0 \\ 0 & h_0 & \ddots & \ddots & \ddots & \ddots & 0 \\ 0 & 0 & h_0 & h_1 & \cdots & h_v & 0 \\ 0 & 0 & \cdots & h_0 & h_1 & \cdots & h_v \end{bmatrix},$$

and $e_{\Delta_{opt}}$ is a unit column vector which has a "1" in its $_{\Delta_{opt}}$ entry and zeros everywhere else; e.g., $$e\Delta_{opt} = \begin{bmatrix} 0 \\ \vdots \\ 0 \\ 1 \\ 0 \\ \vdots \\ 0 \end{bmatrix} \leftarrow \Delta_{opt}.$$

Encryption

According to another embodiment of the invention, the data sequence is encrypted. An encryption feature, of any type generally available and known, is added to the data sequence so that the known data sequence will be available only to qualified receivers such as, for example, those subscribers who have paid a periodic of pay-for-view access charge. When applied in combination with other embodiments of the invention, a private data channel packet is received and if it is encrypted, the packet is first decrypted by a receiver. In one embodiment of the present invention this is accomplished by utilizing a keying variable. The un-encrypted or decrypted data bits of the private data channel packet may be used for different purposes, such to provide error detection for other received packets' data, to provide error correction for other received packets' data, to provide data that could be used to remove measured data distortion or distortion that was purposely introduced as part of a pay for quality service, as well as to provide a channel estimate for reduction of multipath effects.

Encryption of the data sequence may be added so that it may be available only to qualified receivers. Encryption/decryption is accomplished by a "classical" or "one-key" cryptographic system such as the Data Encryption Standard (DES) as defined in the Federal Information Processing Standard 46 (1977) and in a mode defined in Federal Information Processing Standard 81 (1980). Further cryptographic architectural information regarding the DES and its modes of operation is contained in the article "Data Encryption Standard," by Hershey and Pomper, and is found in Vol. 5, pp. 227–251 of the Froehlich/Kent Encyclopedia of Telecommunications, Marcel Dekker, Inc.

Figure 5:
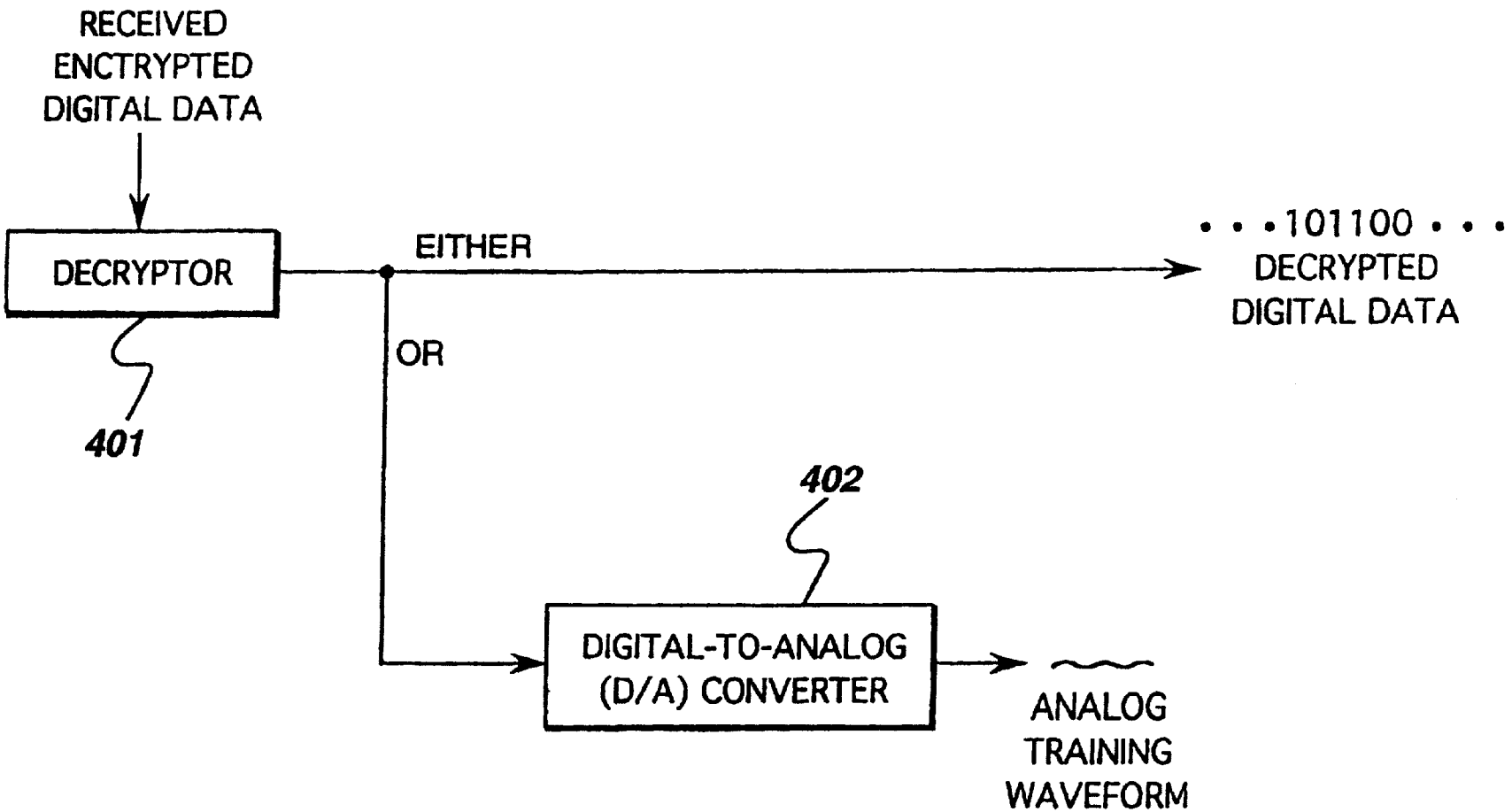
FIG. 5 is a block diagram of a decrypter according to one embodiment of the present invention.

In practice, only digital data to be transmitted is encrypted. As shown in FIG. 5 at the receiver, the received encrypted digital data is input to a decryptor 401 which outputs decrypted digital data. This output is input to a digital-to-analog (D/A) converter 402 which generates an analog waveform from the decrypted digital data.

Dynamic Frame Structure

Figure 6:
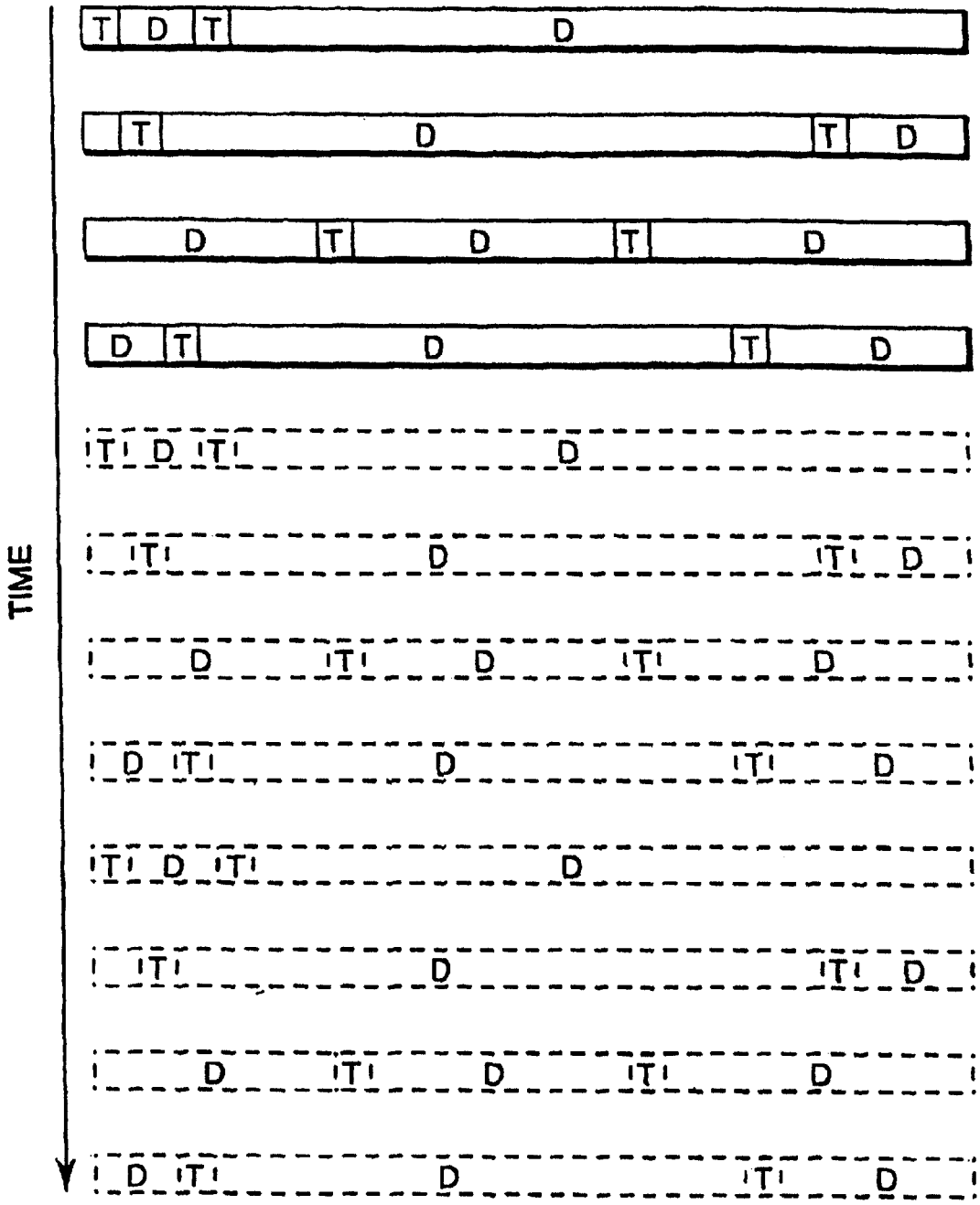
FIG. 6 is a timing diagram showing a rolling frame training sequence according to the fourth aspect of the invention.

In one embodiment of the invention, a dynamic or rolling frame/packet structure is used as depicted in FIG. 6. This structure allows a data sequence and staggered slots to be used for countering multipath and, in this way, different multipath delays may be easily estimated. As illustrated in FIG. 6, T stands for Training Sequence Interval and D stands for Data Sequence Interval. Data sequences are bits, while training sequence intervals may contain bits or segments of a specially crafted channel diagnostic waveform. The example shown in FIG. 5 has a repetition length of four frames and inter-training sequence intervals that are spaced so that measurements may be easily made over many different time delays. For example, if there were errors that typically occurred between segments spaced by four micro-seconds but not one or two or three or five, then it is concluded that there is a strong multipath component at four microseconds.

The training sequence and staggered slots for countering multipath depends upon there being a large number of different inter-interval spacings. By sending known wave-forms (modulated bits) in training intervals (i.e., the Ts), it is possible to locate, within an interval of time, the delays of the strong multipath components. For example, if two identical transmitted waveform Ts are separated by four time intervals and the corresponding received Ts are not identical, an average value of their difference can be formed, and this average value will reflect the average multipath component at a delay of four time intervals. In the time domain, let x(t) be a known training sequence and assume that x(t+4) was also transmitted. Assume that there is a strong multipath component with delay τ+4. Assume y(t) and y(t+4), respectively, are received. The average difference is computed as δ(t)=y(t+4)−y(t), where this average difference removes the effects of uncorrelated multipath from other intervals. What δ(t) produces is −kx(t−τ) where k is the strengths of the multipath, k<1 and τ⁻4. If the average value of δ(t) is not zero, then an estimate of k and τ is solved or, in the alternative, the knowledge that there is a large multipath component with τ⁻4 is used as ancillary information to aid the second aspect of the invention of estimation of equalizer directly from the channel information.

While the invention has been described in terms of a single preferred embodiment, those skilled in the art will recognize that the invention can be practiced with modification within the spirit and scope of the appended claims.

What is claimed is:

1. A method of filtering a digital television transmission comprising the steps of:

generating a *plurality of* packetized first data [sequence] *sequences distributed over a training interval* at a transmitter;

transmitting through a channel, a digital television stream including said packetized first data [sequence] *sequences*;

receiving said digital television stream at a receiver and recovering said first data [sequence] *sequences* [from said digital television stream;

comparing *ones of* said first data [sequence] *sequences* to a second data sequence, said second data sequence being locally generated, to provide a channel estimate;

applying said received television bit stream to an adaptive filter;

adaptively adjusting filter coefficients of said adaptive filter according to said channel estimate such that undesirable channel effects upon said received television stream are filtered from said received television stream, *wherein the digital television transmission is a digital television signal and said data sequences are transmitted in a private channel of an MPEG (Motion Picture Expert Group) data channel*.

[2. The method of filtering a digital television transmission according to claim 1 wherein the digital television transmission is a high definition television (HDTV) signal and said data sequences are transmitted in a private channel of an MPEG (Motion Picture Expert Group) data channel.]

3. The method of filtering a digital television transmission according to claim 1 wherein said first data sequence is corrupted by noise after passage through said channel to said receiver.

4. The method *of* filtering a digital television transmission to according to claim 3 wherein said first data sequence corrupted by noise is used to compute an estimate of channel frequency response.

5. [The method of filtering a digital television transmission according to claim 4] *A method of filtering a digital television transmission comprising the steps of:*

*generating a packetized first data sequence at a transmitter;*

*transmitting through a channel, a digital television stream including said packetizing first data sequence;*

*receiving said digital television stream at a receiver and recovering said first data sequence from first data sequence from said digital television stream;*

*comparing said first data sequence to a second data sequence, said second data sequence being locally generated, to provide a channel estimate;*

*applying said received television bit stream to an adaptive filter;*

*adaptively adjusting filter coefficients of said adaptive filter according to said channel estimate such that undesirable channel effects upon said received television stream are filtered from said received television stream, wherein said first data sequence is corrupted by noise after passage through said channel to said receiver and is used to compute an estimate of channel frequency response, and* wherein the step of comparing comprises the steps of:

computing a Fast Fourier Transform (FFT) of said first data sequence corrupted by noise;

computing a FFT of said second data sequence; and dividing the FFT of said first data sequence by the FFT of said second data sequence to provide said estimate of channel frequency response.

6. The method of filtering a digital television transmission according to claim 5 further comprising the step of determining said channel [impulse] *frequency* response using a quotient from said step of dividing.

7. The method *of* filtering a digital television transmission according to claim 6 wherein the step of determining said channel [impulse] *frequency* response comprises the step of windowing an Inverse FFT (IFFT) of said quotient of the dividing step.

8. The method of filtering a digital television transmission according to claim 7 further comprising the step of estimating noise variance by computing average energy of channel estimation error sequence as a function of said windowed IFFT, said first data sequence corrupted by noise and said second data sequence.

9. The method of filtering a digital television transmission according to claim 8 wherein *said* step of estimating noise variance comprises the steps of:

convolving said windowed IFFT with said second data sequence to generate an estimated noiseless output;

subtracting said estimated noiseless output from said first data sequence corrupted by noise to generate a difference signal; and computing an average energy estimation from said difference signal.

10. The method of filtering a digital television transmission according to claim 9 wherein said channel [impulse] *frequency* response and the estimate of noise variance are used to computer optimum equalizer coefficients for the step of adaptively adjusting filter coefficients.

11. The method *of* filtering a digital television transmission according to claim 1 wherein said first transmitted data sequence is encrypted.

12. [The method of filtering a digital television transmission according to claim 1] *A method of filtering a digital television transmission comprising the steps of:*

*generating a packetized first data sequence at a transmitter;*

*transmitting through a channel, a digital television stream including said packetizing first data sequence;*

*receiving said digital television stream at a receiver and recovering said first data sequence from first data sequence from said digital television sequence;*

*comparing said first data sequence to a second data sequence, said second data sequence being locally generated, to provide a channel estimate;*

*applying said received television bit stream to an adaptive filter;*

*adaptively adjusting filter coefficients of said adaptive filter according to said channel estimate such that undesirable channel effects upon said received television stream are filtered from said received television stream,* wherein said first data sequence is transmitted in a dynamic or rolling frame/packet structure.

13. [A system] *An apparatus* for filtering a digital television signal comprising:

a generator for generating first data sequences at a transmitter and the transmitter for broadcasting said digital television signal including said first data sequences in a broadcast channel;

a receiver for receiving the digital television signal, said receiver including:

a channel estimator for comparing [said] first data sequences to second data sequences, said second data sequences being locally generated, and for providing an estimate of the impulse response of said channel at an output of said channel estimator; and an adaptive equalizer filter including an input for receiving said digital television signal, and filter taps in communication with said output of said channel estimator such that filter coefficients of said adaptive filter are adjusted according to said estimate of said impulse response of said channel, *wherein the digital television signal comprises a high definition television (HDTV) signal and said first data sequences are transmitted in a private data stream of an MPEG (Motion Picture Expert Group) channel.*

[14. The apparatus for filtering a digital television signal according to claim 13 wherein the digital television signal comprises a high definition television (HDTV) signal and said first data sequences are transmitted in a private data stream of an MPEG (Motion Picture Expert Group) channel.]

15. The apparatus for filtering a digital television signal according to claim 13 wherein said first data sequences are corrupted by noise after passage through the channel to the receiver.

16. The apparatus for filtering a digital television signal according to claim 15 wherein said first data sequences corrupted by noise are used to compute an estimate of the frequency response of said channel.

17. [The apparatus for filtering a digital television transmission according to claim 16] *An apparatus for filtering a digital television signal comprising:*

*a generator for generating first data sequences at a transmitter and the transmitter for broadcasting said digital television signal including said first data sequences in a broadcast channel;*

*a receiver for receiving the digital television signal, said receiving including;*

*a channel estimator for comparing said first data sequences to second data sequences, said second data sequences being locally generated, and for providing an estimate of the impulse response of said channel at an output of said channel estimator; and*

*an adaptive equalizer filter including an input for receiving said digital television signal, and filter taps in communication with said output of said channel estimator such that filter coefficients of said adaptive filter are adjusted according to said estimate of said impulse response of said channel, wherein the digital television signal comprises a high definition television (HDTV) signal and said first data sequences are corrupted by noise after passage through the channel to the receiver, said first data sequences corrupted by noise being used to compute an estimate of the frequency response of said channel,* wherein said channel estimator comprises:

a first Fast Fourier Transform (FFT) processor for computing a FFT of said first data sequences corrupted by noise;

a generator for generating the second data sequences at the receiver;

a second FFT processor for computing a FFT of said second data sequences; and a divider for dividing an output of said first FFT processor by an output of said second FFT processor to produce said estimate of channel frequency response.

18. The apparatus for filtering a digital television signal according to claim 17 further comprising an estimator for estimating the channel impulse response using a quotient from said divider.

19. The apparatus for filtering said digital television signal according to claim 18 wherein said estimator includes a processor for windowing an Inverse FFT (IFFT) of the quotient of the divider.

20. The apparatus for filtering a digital television signal according to claim 19 further comprising a channel estimator configured to provide an estimate of noise variance by computing average energy of channel estimation error sequence as a function of said windowed IFFT, said first data sequences corrupted by noise and said second data sequences.

21. The apparatus for filtering a digital television signal according to claim 20 wherein said noise variance estimator comprises:

a convolver for convolving said windowed IFFT with said second data sequences to generate an estimated noiseless output;

a subtractor for subtracting said estimated noiseless output from said first data sequences corrupted by noise to generate a difference signal; and a processor for computing an average energy estimation from said difference signal.

22. The apparatus for filtering a digital television signal according to claim 20 wherein said channel impulse response and said estimate of noise variance are used to compute optimum equalizer coefficients for adaptively adjusting filter coefficients.

23. The apparatus for filtering a digital television signal according to claim 13 wherein said first data sequences are encrypted.

24. [The apparatus for filtering a digital television signal according to claim 13] *An apparatus for filtering a digital television signal comprising:*

*a generator for generating first data sequences at a transmitter and the transmitter for broadcasting said digital television signal including said first data sequences in a broadcast channel;*

*a receiver for receiving the digital television signal, said receiver including:*

*a channel estimator for comparing said first data sequences to second data sequences, said second data sequences being locally generated, and for providing an estimate of the impulse response of said channel at an output of said channel estimator; and*

*an adaptive equalizer filter including an input for receiving said digital television signal, and filter taps in communication with said output of said channel estimator such that filter coefficients of said adaptive filter are adjusted according to said estimate of said impulse response of said channel,* wherein said first data sequences are transmitted in a dynamic or rolling frame/packet structure.

*25. A method of processing a digital television stream including a plurality of first data sequences distributed over a training interval transmitted through a channel comprising the steps of:*

*receiving said digital television stream at a receiver and recovering said first data sequence from said digital television stream;*

*comparing at least one of said first data sequences to a second data sequence, said second data sequence being locally generated;*

*applying said received television stream to an adaptive filter;*

*adaptively adjusting filter coefficients of said adaptive filter according to said comparing step such that undesirable channel effects upon said received television stream are filtered from said received television stream, wherein the digital television stream is a high definition television (HDTV) signal and said first data sequences are transmitted in a channel of an MPEG (Motion Picture Expert Group) data channel.*

*26. The method of processing a digital television stream according to claim 25 wherein said first data sequences are corrupted by noise after passage through said channel to said receiver.*

*27. The method of processing a digital television stream to according to claim 26 wherein said first data sequences corrupted by noise are used to compute an estimate of channel frequency response.*

*28. The method processing a digital television stream according to claim 25 wherein said first data sequence is encrypted.*

*29. A method of processing a digital television stream including a packetized first data sequence transmitted through a channel comprising the steps of:*

*receiving said digital television stream at a receiver and recovering said first data sequence from said digital television stream;*

*comparing said first data sequence to a second data sequence, said second data sequence being locally generated, to provide a channel estimate;*

*applying said received television stream to an adaptive filter;*

*adaptively adjusting filter coefficients of said adaptive filter according to said channel estimate such that undesirable channel effects upon said received television stream are filtered from said received television stream, wherein said first data sequence is corrupted by noise after passage through said channel to said receiver and is used to compute an estimate of channel frequency response, wherein the step of comparing comprises the steps of:*

*computing a Fast Fourier Transform (FFT) of said first data sequence corrupted by noise;*

*computing a FFT of said second data sequence; and*

*dividing the FFT of said first data sequence by the FIT of said second data sequence to provide said estimate of channel frequency response.*

*30. The method of processing a digital television stream according to claim 29 further comprising the step of determining said channel frequency response using a quotient from said step of dividing.*

*31. The method of processing a digital television stream according to claim 30 wherein the step of determining said channel frequency response comprises the step of windowing an Inverse FFT (IFFT) of said quotient of the dividing step.*

*32. The method of processing a digital television stream according to claim 31 further comprising the step of estimating noise variance by computing average energy of channel estimation error sequence as a function of said windowed IFFT, said first data sequence corrupted by noise and said second data sequence.*

*33. The method of processing a digital television stream according to claim 32 wherein said step of estimating noise variance comprises the steps of:*

*convolving said windowed IFFT with said second data sequence to generate an estimated noiseless output;*

*subtracting said estimated noiseless output from said first data sequence corrupted by noise to generate a difference signal; and*

*computing an average energy estimation from said difference signal.*

*34. The method of processing a digital television stream according to claim 33 wherein said channel frequency response and the estimate of noise variance are used to compute optimum equalizer coefficients for the step of adaptively adjusting filter coefficients.*

*35. A method of processing a digital television stream including a packetized first data sequence transmitted through a channel comprising the steps of:*

*receiving said digital television stream at a receiver and recovering said first data sequence from said digital television stream;*

*comparing said first data sequence to a second data sequence, said second data sequence being locally generated, to provide a channel estimate;*

*applying said received television stream to an adaptive filter;*

*adaptively adjusting filter coefficients of said adaptive filter according to said channel estimate such that undesirable channel effects upon said received television stream are filtered from said received television stream, wherein said first data sequence is transmitted in a dynamic or rolling frame/packet structure.*

*36. A method of transmitting a digital television stream through a channel comprising the steps of:*

*generating a plurality of packetized first data sequences distributed over a training interval to be compared in a receiver coupled to said channel to a second data sequence, said second data sequence being locally generated, to adaptively adjust filter coefficients of an adaptive filter such that undesirable channel effects on a television stream received from said channel are filtered from said received television stream; and*

*transmitting through said channel, a digital television stream including said packetized first data sequences, wherein said first data sequences are transmitted in a private channel of an MPEG (Motion Picture Expert Group) data channel.*

*37. The method of transmitting a digital television stream according to claim 36 wherein said first data sequences are corrupted by noise after passage through said channel to said receiver.*

*38. The method of transmitting a digital television stream to according to claim 37 wherein said first data sequences corrupted by noise are used to compute an estimate of channel frequency response.*

*39. The method of transmitting a digital television stream according to claim 36 wherein said first transmitted data sequence is encrypted.*

*40. A method of transmitting a digital television stream through a channel comprising the steps of:*

*generating a packetized first data sequence to be compared in a receiver coupled to said channel to a second data sequence, said second data sequence being locally generated, to provide a channel estimate for adaptively adjusting filter coefficients of an adaptive filter such that undesirable channel effects on a television stream received from said channel are filtered from said received television stream; and*

*transmitting through said channel, a digital television stream including said*

*packetized first data sequence, wherein said first data sequence is corrupted by noise after passage through*

*said channel to said receiver, said first data sequence corrupted by noise being used to compute an estimate of channel frequency response, wherein the step of comparing comprises the steps of:*

*computing a Fast Fourier Transform (FFT) of said first data sequence corrupted by noise;*

*computing; a FFT of said second data sequence; and*

*dividing the FFT of said first data sequence by the FFT of said second data sequence to provide said estimate of channel frequency response.*

*41. The method of transmitting a digital television stream according to claim 40 further comprising the step of determining said channel frequency response using a quotient from said step of dividing.*

*42. The method of transmitting a digital television stream according to claim 41 wherein the step of determining said channel frequency response comprises the step of windowing an Inverse FFT (IFFT) of said quotient of the dividing step.*

*43. The method of transmitting a digital television stream according to claim 42 further comprising the step of estimating noise variance by computing average energy of channel estimation error sequence as a function of said windowed IFFT said first data sequence corrupted by noise and said second data sequence.*

*44. The method of transmitting a digital television stream according to claim 43 wherein said step of estimating noise variance comprises the steps of:*

*convolving said windowed IFFT with said second data sequence to generate an estimated noiseless output;*

*subtracting said estimated noiseless output from said first data sequence corrupted by noise to generate a difference signal; and*

*computing an average energy estimation from said difference signal.*

*45. The method of transmitting a digital television stream according to claim 44 wherein said channel frequency response and the estimate of noise variance are used to compute optimum equalizer coefficients for the step of adaptively adjusting filter coefficients.*

*46. A method of transmitting a digital television stream through a channel comprising the steps of:*

*generating a packetized first data sequence to be compared in a receiver coupled to said channel to a second data sequence, said second data sequence being locally generated, to provide a channel estimate for adaptively adjusting filter coefficients of an adaptive filter such that undesirable channel effects on a television stream received from said channel are filtered from said received television stream; and*

*transmitting through said channel, a digital television stream including said packetized first data sequence, wherein said first data sequence is transmitted in a dynamic or rolling frame/packet structure.*

*47. An apparatus for processing a digital television signal including a plurality of first data sequences distributed over a training interval transmitted in a broadcast channel comprising:*

*a receiver for receiving said digital television signal, said receiver including;*

*a comparator for comparing said first data sequences to second data sequences, said second data sequences being locally generated; and*

*an adaptive equalizer filter including an input for receiving said digital television signal, and being in communication with said output of said such that filter coefficients of said adaptive filter are adjusted in response to comparator, wherein said first data sequences are transmitted in an MPEG Motion Picture Expert Group) channel.*

*48. The apparatus for processing a digital television signal according to claim 47 wherein said first data sequences are corrupted by noise after passage through said channel to said receiver.*

*49. The apparatus for processing a digital television signal according to claim 48 wherein said first data sequences corrupted by noise are used to compute an estimate of the frequency response of said channel.*

*50. The apparatus for processing a digital television signal according to claim 47 wherein said first data sequences are encrypted.*

*51. An apparatus for processing a digital television signal including first data sequences transmitted in a broadcast channel comprising:*

*a receiver for receiving said digital television signal, said receiver including:*

*a channel estimator for comparing said first data sequences to second data sequences, said second data sequences being locally generated, and for providing an estimate of the impulse response of said channel at an output of said channel estimator; and*

*an adaptive equalizer filter including an input for receiving said digital television signal, and filter taps in communication with said output of said channel estimator such that filter coefficients of said adaptive filter are adjusted according to said estimate of said impulse response of said channel, wherein said first data sequences are corrupted by noise after passage through said channel to said receiver and wherein said first data sequences corrupted by noise are used to compute an estimate of the frequency response of said channel, wherein said channel estimator comprises:*

*a first Fast Fourier Transform (FFT) processor for computing a FFT of said first data sequences corrupted by noise;*

*a generator for generating the second data sequences at the receiver;*

*a second FFT processor for computing a FFT of said second data sequences; and*

*a divider for dividing an output of said first FFT processor by an output of said second FFT processor to produce said estimate of channel frequency response.*

*52. The apparatus for processing a digital television signal according to claim 51 further comprising; an estimator for estimating the channel impulse response using a quotient from said divider.*

*53. The apparatus for processing a digital television signal according to claim 52 wherein said estimator includes a processor for windowing an Inverse FFT (IFFT) of the quotient of the divider.*

*54. The apparatus for processing a digital television signal according to claim 53 further comprising a channel estimator configured to provide an estimate of noise variance by computing average energy of channel estimation error sequence as a function of said windowed IFFT, said first data sequences corrupted by noise and said second data sequences.*

*55. The apparatus for processing a digital television signal according to claim 54 wherein said noise variance estimator comprises:*

*a convolver for convolving said windowed IFFT with said second data sequences to generate an estimated noiseless output;*

*a subtractor for subtracting said estimated noiseless output from said first data sequences corrupted by noise to generate a difference signal; and*

*a processor for computing average energy estimation from said difference signal.*

*56. The apparatus for processing a digital television signal according to claim 55 wherein said channel impulse response and said estimate of noise variance are used to compute optimum equalizer coefficients for adaptively adjusting filter coefficients.*

*57. An apparatus for processing a digital television signal including first data sequences transmitted in a broadcast channel comprising:*

*a receiver for receiving said digital television signal, said receiver including;*

*a channel estimator for comparing said first data sequences to second data sequences, said second data sequences being locally generated, and for providing an estimate of the impulse response of said channel at an output of said channel estimator; and*

*an adaptive equalizer filter including an input for receiving said digital television signal, and filter taps in communication with said output of said channel estimator such that filter coefficients of said adaptive filter are adjusted according to said estimate of said impulse response of said channel, wherein said first data sequences are transmitted in a dynamic or rolling frame/packet structure.*

*58. An apparatus for transmitting a digital television signal through a channel comprising:*

*a generator for generating a plurality of first data sequences distributed over a training interval to be compared in a receiver to at least one second data sequence, said second data sequence being locally generated to adjust filter coefficients of an adaptive filter; and*

*a transmitter for transmitting a digital television signal including said first data sequences through said channel, wherein said first data sequences are transmitted in an MPEG (Motion Picture Expert Group) channel.*

*59. The apparatus for transmitting a digital television signal according to claim 58 wherein said first data sequences are corrupted by noise after passage through the channel to said receiver.*

*60. The apparatus for transmitting a digital television signal according to claim 59 wherein said first data sequences corrupted by noise are used to compute an estimate of the frequency response of said channel.*

*61. The apparatus for transmitting a digital television transmission according to claim 60 wherein said channel estimator comprises:*

*a first Fast Fourier Transform (FFT) processor for computing a FFT of said first data sequences corrupted by noise;*

*a generator for generating said second data sequences at the receiver;*

*a second FFT processor for computing a FFT of said second data sequences; and*

*a divider for dividing an output of said first FFT processor by an output of said second FFT processor to produce said estimate of channel frequency response.*

*62. The apparatus for transmitting a digital television signal according to claim 61 further comprising an estimator for estimating the channel impulse response using a quotient from said divider.*

*63. The apparatus for transmitting a digital television signal according to claim 62 wherein said estimator includes a processor for windowing an Inverse FFT (IFFT) of the quotient the divider.*

*64. The apparatus for transmitting a digital television signal according to claim 63 further comprising a channel estimator configured to provide an estimate of noise variance by computing average energy of channel estimation error sequence as a function of said windowed IFFT, said first data sequences corrupted by noise and said second data sequences.*

*65. The apparatus for transmitting a digital television signal according to claim 64 wherein said noise variance estimator comprises:*

*a convolver for convolving said windowed IFFT with said second data sequences to generate an estimated noiseless output;*

*a subtractor for subtracting said estimated noiseless output from said first data sequences corrupted by noise to generate a difference signal; and*

*a processor for computing average energy estimation from said difference signal.*

*66. The apparatus for transmitting a digital television signal according to claim 64 wherein said channel impulse response and said estimate of noise variance are used to compute optimum equalizer coefficients for adaptively adjusting, filter coefficients.*

*67. An apparatus for transmitting a digital television signal through a channel comprising:*

*a generator for generating first data sequences to be compared in a receiver to second data sequences, said second data sequences being locally generated to provide an estimate of the impulse response of said channel for adjusting filter coefficients of an adaptive filter; and*

*a transmitter for transmitting a digital television signal including said first data sequences through said channel, wherein the digital television signal comprises a high definition television (HDTV) signal and said first data sequences are transmitted in a private data stream of an MPEG (Motion Picture Expert Group) channel, wherein said first data sequences are encrypted.*

*68. An apparatus for transmitting a digital television signal through a channel comprising:*

*a generator for generating first data sequences to be compared in a receiver to second data sequences, said second data sequences being locally generated to provide an estimate of the impulse response of said channel for adjusting filter coefficients of an adaptive filter; and*

*a transmitter for transmitting a digital television signal including said first data sequences through said channel, wherein said first data sequences are transmitted in a dynamic or rolling frame/packet structure.*

* * * * *